US009610654B1

(12) United States Patent
Matsen et al.

(10) Patent No.: US 9,610,654 B1
(45) Date of Patent: Apr. 4, 2017

(54) CONFORMABLE INDUCTION COILS FOR INDUCTION JOINING

(71) Applicant: The Boeing Company, Chicago, IL (US)

(72) Inventors: Marc Rollo Matsen, Seattle, WA (US); Robert James Miller, Fall City, WA (US)

(73) Assignee: THE BOEING COMPANY, Chicago, IL (US)

( * ) Notice: Subject to any disclaimer, the term of this patent is extended or adjusted under 35 U.S.C. 154(b) by 680 days.

(21) Appl. No.: 14/021,468

(22) Filed: Sep. 9, 2013

(51) Int. Cl.
 H05B 6/04 (2006.01)
 H05B 6/10 (2006.01)
 B23K 28/00 (2006.01)

(52) U.S. Cl.
 CPC ................... *B23K 28/00* (2013.01)

(58) Field of Classification Search
 CPC ..... B29C 33/04; B29C 33/06; B29C 35/0805; B29C 70/54; B29C 70/44; B29C 33/046; B29C 2035/0811; B29C 2035/1616; H05B 6/105; H05B 2206/023
 USPC ........ 219/601–603, 615–617, 632–635, 646, 219/649, 657, 659; 228/157, 193, 122.1, 228/124.1; 156/272.4, 379.6; 428/633, 428/621, 675
 See application file for complete search history.

(56) References Cited

U.S. PATENT DOCUMENTS

| 8,410,409 | B1 | 4/2013 | Matsen et al. |
| 2010/0065552 | A1* | 3/2010 | Matsen ............... B29C 35/0272 219/671 |
| 2012/0145703 | A1 | 6/2012 | Matsen et al. |
| 2012/0291948 | A1 | 11/2012 | Matsen et al. |

OTHER PUBLICATIONS

Matsen et al., "Induction Welding System," U.S. Appl. No. 13/942,055, filed Jul. 15, 2013, 39 pages.
Miller, "Induction Heating Apparatus," U.S. Appl. No. 13/663,150, filed Oct. 29, 2012, 33 pages.

* cited by examiner

*Primary Examiner* — Quang Van
(74) *Attorney, Agent, or Firm* — Yee & Associates, P.C.

(57) ABSTRACT

A method and apparatus for joining parts. A plurality of conformable induction coils embedded in a number of elastomeric sheets is positioned relative to a first composite part of the parts and a second composite part of the parts. A magnetic field is generated with the plurality of conformable induction coils. The magnetic field is configured to generate heat in a magnetically permeable material at a joint location. The heat joins the first composite part and the second composite part to each other.

9 Claims, 11 Drawing Sheets

CONFORMABLE INDUCTION COILS FOR INDUCTION JOINING

BACKGROUND INFORMATION

1. Field

The present disclosure relates generally to manufacturing and, in particular, to manufacturing composite structures. Still more particularly, the present disclosure relates to methods and apparatuses for joining parts to form a composite structure.

2. Background

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

Composite materials are tough, light-weight materials created by combining two or more functional components. For example, a composite material may include reinforcing fibers bound in a polymer resin matrix. Resins used in composite materials may include thermoplastic or thermoset resins. A thermoplastic material may become soft upon heating and may harden upon cooling. A thermoplastic material may be able to be repeatedly heated and cooled. A thermoset material may become hard when heated. The fibers may be unidirectional or may take the form of a woven cloth or fabric.

In manufacturing a composite structure, different parts are connected to each other to form the composite structure. For example, composite materials may be laid up in the shape of a composite part. This composite part may then be joined with other composite parts to form a composite structure. The current methods of joining composite parts may use an undesirable amount of time, energy, money, or resources. Further, the current methods of joining composite parts may result in a composite structure with an undesirable characteristic, such as an undesirable weight. Therefore, it would be desirable to have a method and apparatus that take into account at least some of the issues discussed above, as well as other possible issues.

SUMMARY

An illustrative embodiment provides a method for joining parts. A plurality of conformable induction coils embedded in a number of elastomeric sheets is positioned relative to a first composite part of the parts and a second composite part of the parts. A magnetic field is generated with the plurality of conformable induction coils. The magnetic field is configured to generate heat in a magnetically permeable material at a joint location. The heat joins the first composite part and the second composite part to each other.

Another embodiment of the present disclosure provides an apparatus for joining a first composite part and a second composite part. The apparatus comprises a number of elastomeric sheets, a plurality of conformable induction coils embedded in the number of elastomeric sheets, a number of tools, and a magnetically permeable material.

Yet another embodiment of the present disclosure provides an aircraft. The aircraft comprises a first composite part, a second composite part, the first composite part positioned relative to the second composite part to form a joint location; and a magnetically permeable material disposed in the joint location. The first composite part and the second composite part are joined by exposing the magnetically permeable material to a magnetic field.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account a number of different considerations. For example, the different illustrative embodiments recognize and take into account that currently, composite structures may be formed by joining composite parts using fasteners. The different illustrative embodiments recognize and take into account that forming a composite structure without fasteners may reduce the time required to form a composite structure. The different illustrative embodiments recognize and take into account that forming a composite structure without fasteners may reduce the weight of a resulting composite structure.

Additionally, the illustrative embodiments recognize and take into account that thermoset composite parts may be joined by curing the thermoset composite parts together. However, the illustrative embodiments recognize and take into account that the time required to create a composite structure by joining thermoset composite parts by curing the thermoset composite parts together may be undesirable. For example, the illustrative embodiments recognize and take into account that curing a thermoset material may require several hours. In addition to holding the thermoset material at a curing temperature for several hours, conventional autoclaves using resistive heating to cure thermoset materials may further require several hours for heating up and cooling down.

The different illustrative embodiments recognize and take into account that thermoplastic composite parts may be joined together by locally heating the thermoplastic composite parts. However, the different illustrative embodiments recognize and take into account that conventional methods of heating thermoplastic composite parts may require undesirable amounts of resources. For example, conventional induction heating uses tooling which may be undesirably expensive to produce. Further, conventional induction heating tooling uses tooling specific to the shape of the composite structure. As a result, a differently shaped composite structure would have differently shaped tooling. Manufacturing and storing tooling for each shape of composite structures may use an undesirable amount of resources such as time, money, and space.

Thus, the illustrative embodiments provide a method and apparatus for joining parts. In one illustrative embodiment, a plurality of conformable induction coils embedded in a number of elastomeric sheets is positioned relative to a first composite part of the parts and a second composite part of the parts. A magnetic field is generated with the induction coils. The magnetic field is configured to generate heat in a magnetically permeable material at a joint location. The heat joins the first composite part and the second composite part to each other.

Figure 1:
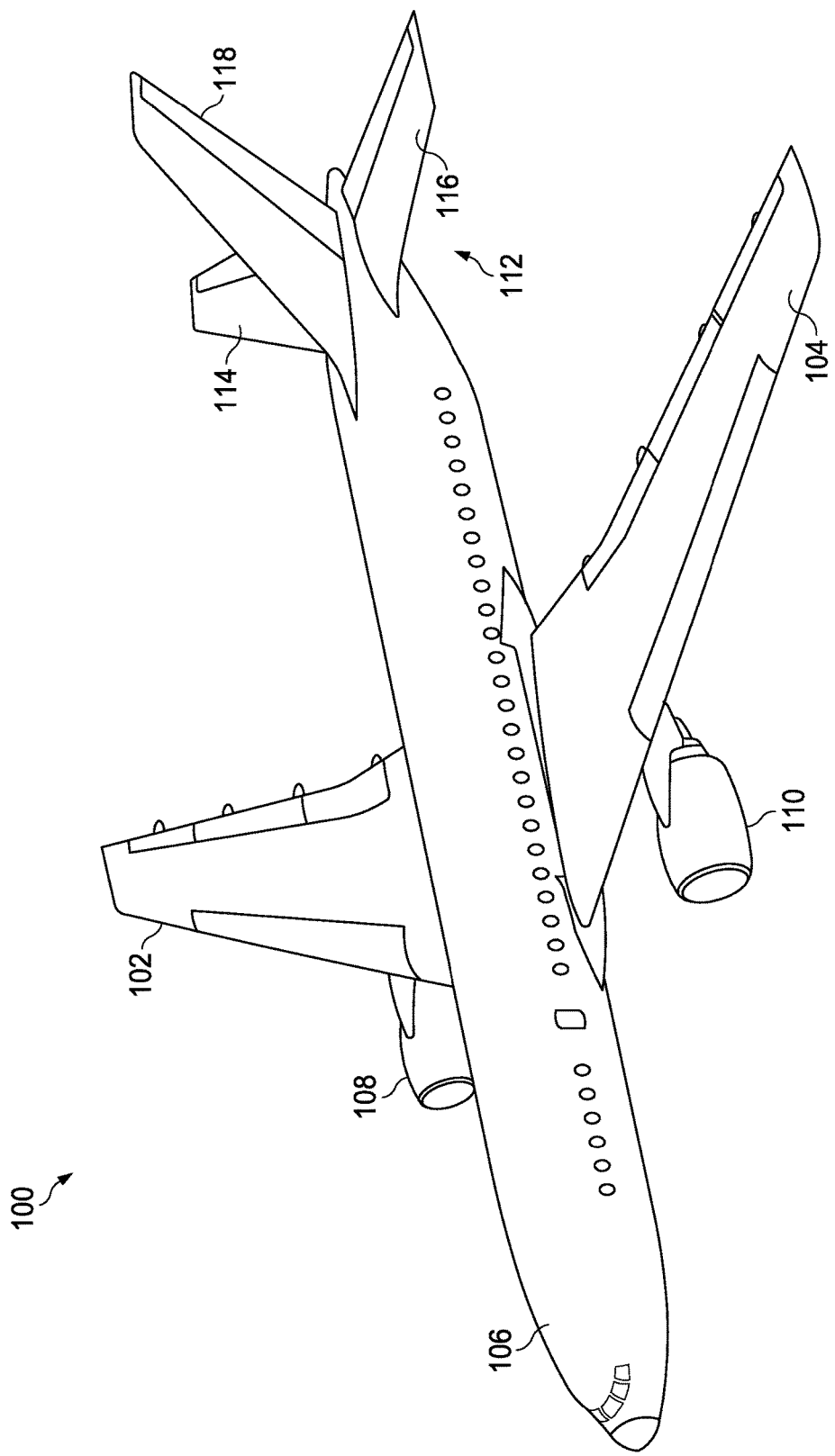
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which conformable induction coils for induction joining may be implemented in accordance with an illustrative embodiment. For example, composite parts in at least one of wing 102 or wing 104 may be joined using conformable induction coils.

The illustration of aircraft 100 in FIG. 1 is not meant to imply physical or architectural limitations to the manner in which an illustrative embodiment may be implemented. For example, although aircraft 100 is a commercial aircraft, aircraft 100 may be a military aircraft, a rotorcraft, a helicopter, an unmanned aerial vehicle, or any other suitable aircraft.

Although the illustrative examples for an illustrative embodiment are described with respect to an aircraft, the illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
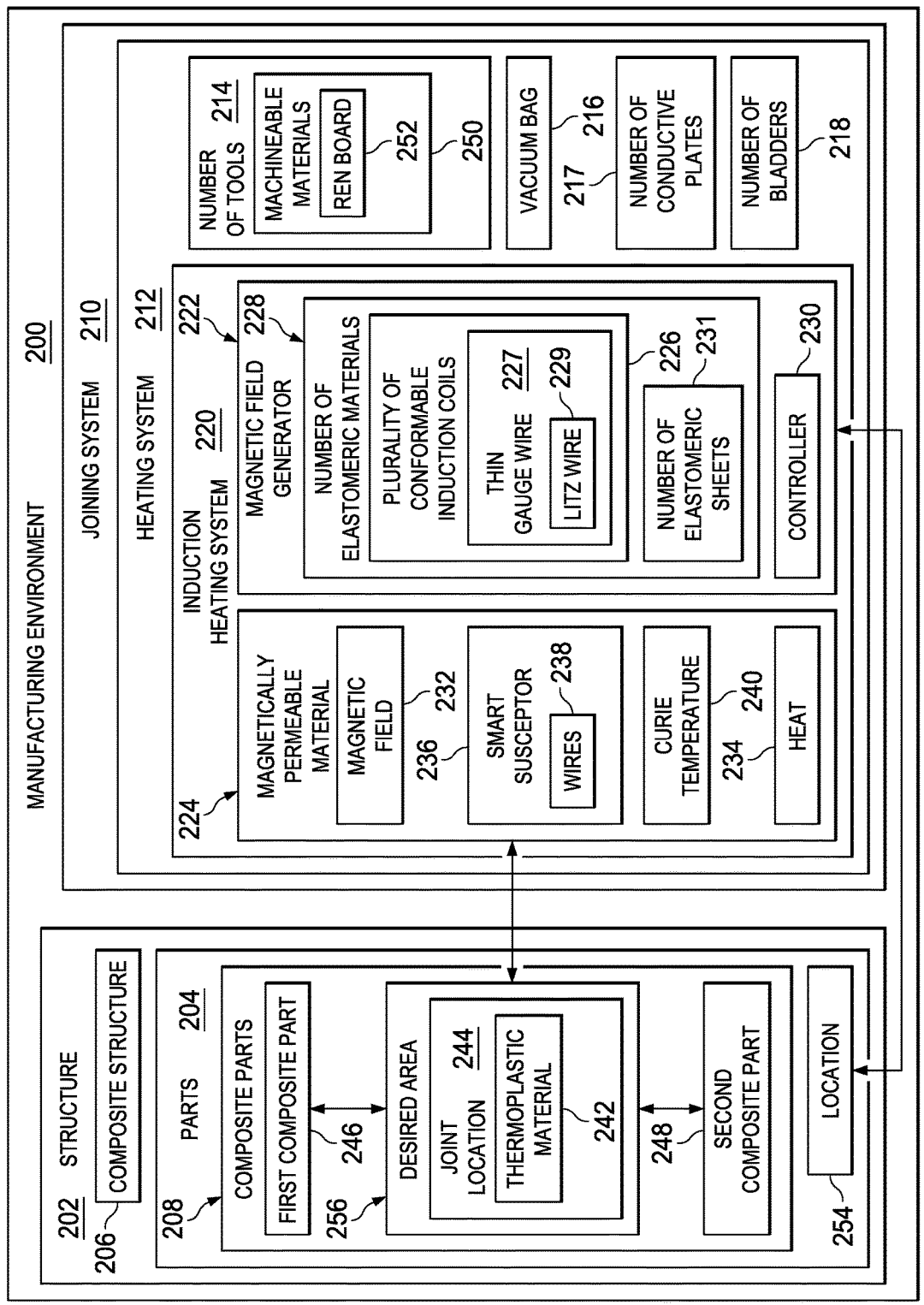
FIG. 2 is an illustration of a manufacturing environment in the form of a block diagram in accordance with an illustrative embodiment.

Turning now to FIG. 2, an illustration of a manufacturing environment is depicted in the form of a block diagram in accordance with an illustrative embodiment. In this illustrative example, manufacturing environment 200 in FIG. 2 is depicted in block form to illustrate different components for one or more illustrative embodiments. As depicted, manufacturing environment 200 may be used to manufacture structure 202 from a plurality of parts 204. In one illustrative example, structure 202 may be a portion of an aircraft such as wing 104 of aircraft 100 in FIG. 1. In this depicted example, structure 202 may take the form of composite structure 206 and parts 204 may be a plurality of composite parts 208. In these illustrative examples, composite parts 208 may be comprised of fiber reinforced materials, such as a fiber reinforced polymer, and in particular, a carbon fiber reinforced plastic (CFRP). The plurality of composite parts 208 may be formed of at least one of thermoplastic or thermoset materials. In some illustrative examples, some composite parts of the plurality of composite parts 208 may be formed of one or more thermoplastic materials while other composite parts of the plurality of composite parts 208 are formed of one or more thermoset materials.

As used herein, the phrase "at least one of," when used with a list of items, means different combinations of one or more of the listed items may be used and only one of each item in the list may be needed. For example, "at least one of item A, item B, or item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

Joining system 210 of manufacturing environment 200 is used to join parts 204 to form structure 202. As depicted, joining system 210 includes heating system 212, number of tools 214, vacuum bag 216, number of conductive plates 217, and number of bladders 218. Number of bladders 218 may be formed of any desirable material. For example, number of bladders 218 may be formed of an elastomeric material.

In this illustrative example, heating system 212 takes the form of induction heating system 220. Heating system 212 includes magnetic field generator 222 and magnetically permeable material 224.

Magnetic field generator 222 may comprise plurality of conformable induction coils 226 embedded in number of elastomeric materials 228 and controller 230. In some illustrative examples, number of elastomeric materials 228 may take the form of number of elastomeric sheets 231. Plurality of conformable induction coils 226 may be formed of thin gauge wire 227. Specifically, plurality of conformable induction coils 226 may be a plurality of lengths of Litz wire 229. Litz wire 229 is a graded fine copper wire. Litz wire 229 is often used for carrying high frequency current. When plurality of conformable induction coils 226 are formed of Litz wire 229, plurality of conformable induction coils 226, and thus magnetic field generator 222, may have reduced weight. Further, when plurality of conformable induction coils 226 are formed of Litz wire 229, plurality of conformable induction coils 226 may have greater flexibility. Yet further, when plurality of conformable induction coils 226 are formed of Litz wire 229, plurality of conformable induction coils 226 may have lower resistive losses.

By using plurality of conformable induction coils 226 instead of conventional rigid induction tooling with induction coils embedded in the tools, magnetic field generator 222 may be used to form structures of varying cross-sections. Further, by using plurality of conformable induction coils 226, magnetic field generator 222 may be less expensive than conventional induction tooling. Yet further, by using plurality of conformable induction coils 226, magnetic field generator 222 may use fewer resources to store and transport magnetic field generator 222.

Number of elastomeric materials 228 and plurality of conformable induction coils 226 may extend across the full length of at least one of first composite part 246 and second composite part 248. In some illustrative examples, plurality of conformable induction coils 226 may extend less than the full length of one of first composite part 246 and second composite part 248. In some illustrative examples, plurality of conformable induction coils 226 may only extend such that magnetic field 232 is generated in desired area 256.

Plurality of conformable induction coils 226 is configured to generate magnetic field 232 under the control of controller 230. Controller 230 is a hardware device and controls the application of current to plurality of conformable induction coils 226 to control the generation of magnetic field 232.

In this illustrative example, magnetic field 232 interacts with magnetically permeable material 224 to cause magnetically permeable material 224 to generate heat 234. Magnetically permeable material 224 is configured to generate heat when exposed to magnetic field 232. In particular, magnetic field 232 may be an electromagnetic flux field that interacts with magnetically permeable material 224. In some illustrative examples, plurality of conformable induction coils 226 are positioned such that plurality of conformable induction coils 226 are directed orthogonal to magnetically permeable material 224 in the form of wires 238. This positioning may be selected to generate magnetic field 232 that desirably interacts with magnetically permeable material 224.

In one illustrative example, magnetically permeable material 224 generates heat when magnetic field 232 fluctuates at a frequency from about 20 kHz to about 500 kHz. The fluctuation of magnetic field 232 may result in heat from electric resistance caused by the flow of current induced within magnetically permeable material 224.

The temperatures in which heating does not pass may be from about 350 degrees F. to about 800 degrees F., depending on the particular material selected in these illustrative examples. For example, the heating may decrease to about zero such that the temperature remains at substantially the same temperature at that time. Of course, other diameters and other temperatures may be used depending on the particular implementation.

Magnetically permeable material 224 may be comprised of various types of materials. For example, magnetically permeable material 224 may be selected from at least one of an alloy, a cobalt, an iron alloy, a nickel and iron alloy, an iron and silicon alloy, an amorphous magnetic alloy, a crystalline magnetic alloy, or some other suitable material. Further, in this illustrative example, magnetically permeable material 224 may take the form of smart susceptor 236.

In some illustrative examples, magnetically permeable material 224 may be in the form of wires 238 having a diameter of about 0.003 inches to about 0.020 inches. Of course, the diameter may vary for different applications. As depicted, smart susceptor 236 may be a magnetically permeable material that has a Curie temperature that is selected for a particular application. The Curie temperature may be selected such that heat generated by the magnetically permeable material in response to an alternating magnetic field decreases sufficiently such that the temperature reaches equilibrium. The heat generated may be about zero. For example, the selection may be such that the temperature is maintained substantially at a temperature for softening thermoplastic material 242 of joint location 244.

Further, magnetically permeable material 224 may have various forms of shapes. For example, magnetically permeable material 224 may have a shape selected from at least one of a wire, a strip, a plate, a sheet, or some other suitable shape. The particular shape selected may vary depending on the particular implementation. For example, a plate may be used for applications in which the avoidance of extraneous heating may be desired. Wires may be used when contours in the shape may be present with some massive complexity. Further, these different components may be segmented rather than one component. Further, different shapes may be used at the same time.

In these illustrative examples, magnetically permeable material 224 may be configured to generate heat 234 to at least soften thermoplastic material 242 of joint location 244. In particular, magnetically permeable material 224 has Curie temperature 240. Curie temperature 240 for magnetically permeable material 224 is selected to be at least a melting temperature for thermoplastic material 242 of joint location 244 in this illustrative example.

As depicted, Curie temperature 240 is the temperature at which magnetic properties of magnetically permeable material 224 reduce. In particular, the magnetic properties may substantially disappear at Curie temperature 240. As a result, magnetically permeable material 224 may not increase in temperature much beyond Curie temperature 240. In these illustrative examples, magnetically permeable material 224 heats up to reach Curie temperature 240 at a desired rate.

With the selection of Curie temperature 240 based on a melting temperature of thermoplastic material 242, magnetically permeable material 224 may be substantially self-controlling. In other words, the temperature that magnetically permeable material 224 reaches may be self-limiting with the selection of Curie temperature 240. In this manner, controller 230 may be simpler in design and implementation.

Parts 204 may be positioned relative to number of tools 214 prior to joining. Number of tools 214 may each be formed of a material having desirable properties. Desirable properties for number of tools 214 may include at least one of cost of material, cost of manufacture, time of manufacture, heat properties of the material, non-reactivity, rigidity, and other material properties. In some illustrative examples, number of tools 214 may be manufactured from machineable materials 250. In one illustrative example, number of tools 214 may be manufactured from a polyurethane foam style board such as Ren board 252.

In one illustrative example, number of tools 214 comprises a first tool. Parts 204 may rest on the first tool prior to and during joining of parts 204. In this illustrative example, parts 204 may be covered by vacuum bag 216. By sealing vacuum bag 216 to the first tool, a vacuum chamber may be formed.

In one illustrative example, number of tools 214 comprises a first tool and a second tool. Parts 204 may be positioned between the first tool and the second tool prior to and during joining of parts 204.

As depicted, parts 204 include first composite part 246 and second composite part 248. First composite part 246 and second composite part 248 are positioned relative to each other to form joint location 244. In some illustrative examples, joint location 244 may include the space between first composite part 246 and second composite part 248. In some illustrative examples, joint location 244 may include the space between first composite part 246 and second composite part 248, and at least one of a portion of first composite part 246 and a portion of second composite part 248.

As depicted, magnetically permeable material 224 is embedded in thermoplastic material 242 in joint location 244. In some illustrative examples, thermoplastic material 242 may be positioned between first composite part 246 and second composite part 248 in joint location 244. In other illustrative examples, thermoplastic material 242 may be a thermoplastic material of one of first composite part 246 and second composite part 248. In these illustrative examples, magnetically permeable material 224 is embedded in thermoplastic material 242 of at least one of first composite part 246 and second composite part 248.

Plurality of conformable induction coils 226 embedded in number of elastomeric materials 228 are positioned relative to first composite part 246 and second composite part 248. As depicted, plurality of conformable induction coils 226 embedded in number of elastomeric materials 228 are positioned in location 254. Location 254 may be positioned relative to joint location 244 such that magnetic field generator 222 may generate a magnetic field in desired area 256.

In some illustrative examples, plurality of conformable induction coils 226 embedded in number of elastomeric materials 228 may be positioned such that number of elastomeric materials 228 cover a surface of first composite part 246. In other illustrative examples, number of elastomeric materials 228 may only cover a portion of first composite part 246.

In some illustrative examples, number of conductive plates 217 is positioned such that a generated magnetic field is present in desired area 256. As depicted, desired area 256 includes joint location 244 containing magnetically permeable material 224.

After positioning parts 204 relative to each other and a first tool of number of tools 214, positioning magnetic field generator 222, and optionally positioning number of conductive plates 217, either a second tool of number of tools 214 or vacuum bag 216 is positioned over parts 204. Afterwards, magnetic field generator 222 generates magnetic field 232 causing magnetically permeable material 224 to produce heat 234. Heat 234 produced by magnetically permeable material 224 softens thermoplastic material 242 which joins parts 204 after cooling.

Thus, joining system 210 may form composite structure 206 with a desired level of performance. In these illustrative examples, heating system 212 in the form of induction heating system 220 may generate heat 234 at the desired temperature within joint location 244. In other words, thermoplastic material 242 may have a desired heat profile throughout joint location 244. The profile may be temperatures for portions of thermoplastic material 242. In these illustrative examples, a temperature may be the same throughout all of thermoplastic material 242.

With the use of plurality of conformable induction coils 226 embedded in number of elastomeric materials 228, parts 204 may be joined without the use of conventional induction tooling which may be undesirably expensive and limited to use for a single cross-section. Plurality of conformable induction coils 226 may provide joining of parts 204 to form structures having a variety of cross-sectional shapes. Use of number of tools 214 formed of machineable materials 250 may reduce the cost of performing joining of parts 204.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although heating system 212 has been illustrated to include magnetic field generator 222 having controller 230 and plurality of conformable induction coils 226, magnetic field generator 222 may include other components in addition to or in place of the ones depicted. For example, magnetic field generator 222 also may include a power source.

In another illustrative example, magnetically permeable material 224 may have one or more Curie temperatures in addition to Curie temperature 240. As a result, magnetically permeable material 224 may be controlled to reach various temperatures depending on the particular implementation.

In a further illustrative example, parts 204 are formed of at least one thermoset material. In this illustrative example, magnetically permeable material 224 may be embedded in thermoplastic material 242 between first composite part 246 and second composite part 248. Although not depicted in FIG. 2, additional layers of thermoplastic material may be adhered to first composite part 246 and second composite part 248. The additional layers of thermoplastic material may be adhered by co-curing an additional layer of thermoplastic material to each of first composite part 246 and second composite part 248.

Figure 3:
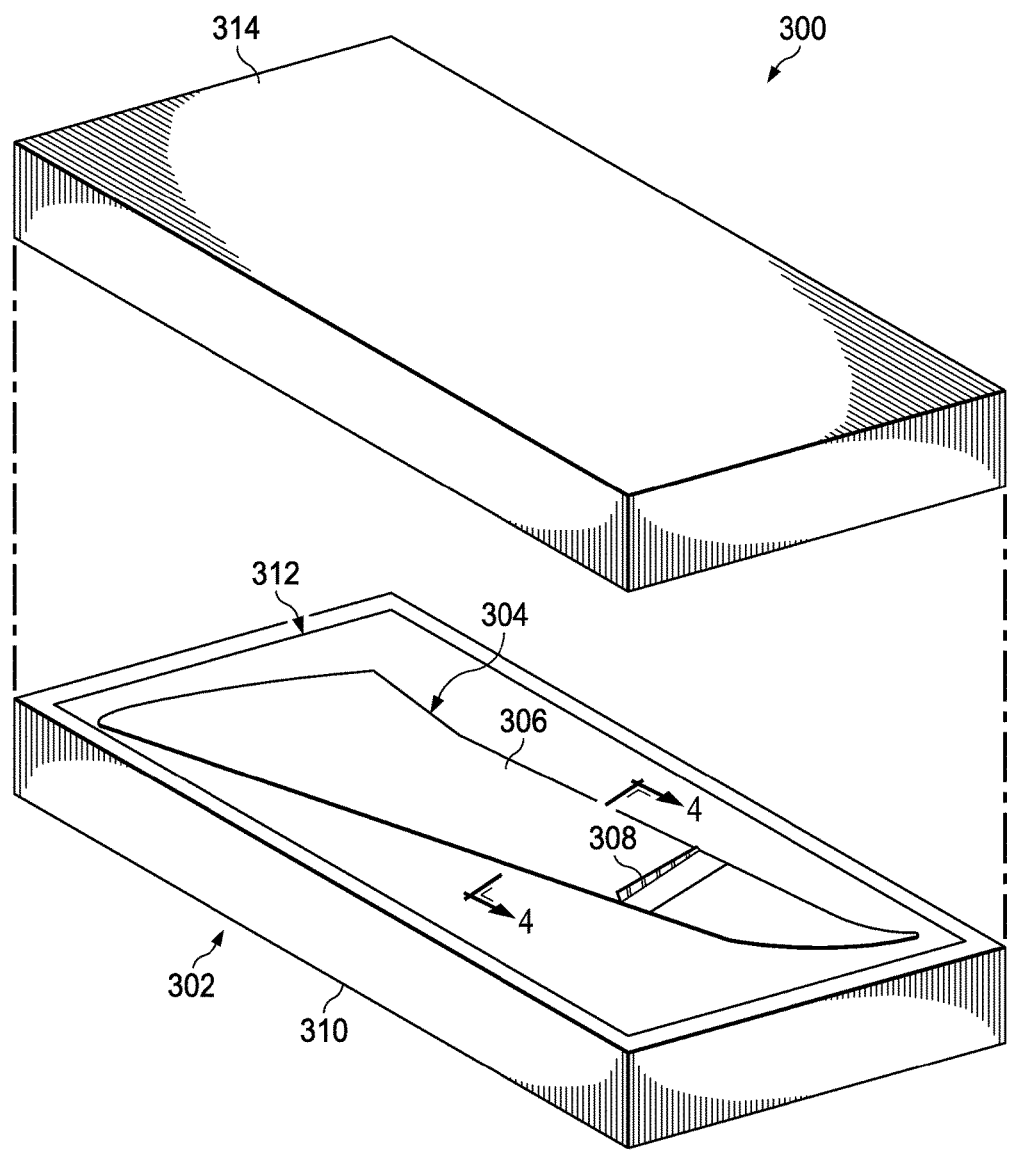
FIG. 3 is an illustration of a composite wing and a joining system in accordance with an illustrative embodiment.

Turning now to FIG. 3, an illustration of a composite wing and a joining system is depicted in accordance with an illustrative embodiment. Environment 300 is a physical implementation of manufacturing environment 200 of FIG. 2.

Environment 300 includes joining system 302 and composite wing 304. Joining system 302 is a physical implementation of joining system 210 of FIG. 2. Joining system 302 is used to join skin panels 306 and support structure 308. Support structure 308 may include ribs and spars as well as other parts. As depicted, these different parts in composite wing 304 are composite parts.

Joining system 302 includes first tool 310, induction heating system 312, and second tool 314. First tool 310 and second tool 314 may each be formed of a material having desirable properties. Desirable properties for first tool 310 and second tool 314 may include at least one of cost of material, cost of manufacture, time of manufacture, heat properties of the material, non-reactivity, rigidity, or other material properties. In some illustrative examples, at least one of first tool 310 and second tool 314 are manufactured from machineable materials. In one illustrative example, at least one of first tool 310 and second tool 314 are manufactured from a polyurethane foam style board such as Ren board.

As depicted, composite wing 304 is a physical implementation of composite structure 206 of FIG. 2. Composite wing 304 may be formed of at least one of thermoplastic materials or thermoset materials. As depicted, composite wing 304 is shown in a partially completed state. As depicted, composite wing 304 includes skin panels 306 and support structure 308. Support structure 308 may include ribs and spars as well as other parts. As depicted, these different parts in composite wing 304 are composite parts.

Figure 4:
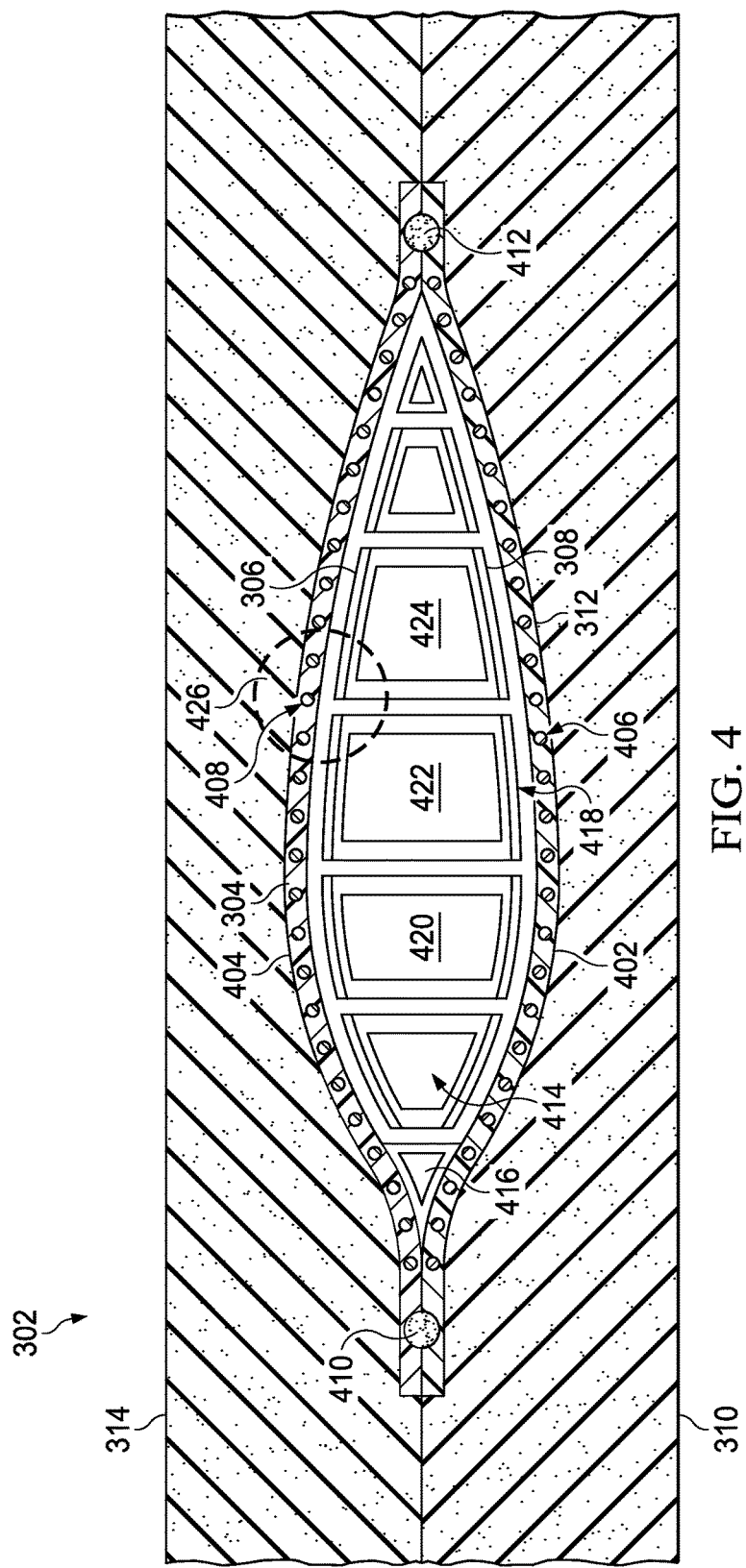
FIG. 4 is an illustration of a cross-section of a composite wing in a joining system in accordance with an illustrative embodiment.

With reference next to FIG. 4, an illustration of a cross-section of a composite wing in a joining system is depicted in accordance with an illustrative embodiment. In this illustrative example, a cross-sectional view of environment 300 is shown taken along lines 4-4 in FIG. 3.

As depicted, composite wing 304 is placed between first tool 310 and second tool 314. More specifically, composite wing 304 is between elastomeric material 402 and elastomeric material 404 of induction heating system 312. Plurality of conformable induction coils 406 are embedded in elastomeric material 402. Plurality of conformable induction coils 408 are embedded in elastomeric material 404. As depicted, elastomeric material 402 is one elastomeric sheet between first tool 310 and composite wing 304. In some illustrative examples, elastomeric material 402 may be more than one elastomeric sheet present between first tool 310 and composite wing 304. Further, as depicted, elastomeric material 402 and plurality of conformable induction coils 406 extend across the full length of the cross-section of composite wing 304. However, in some illustrative examples, plurality of conformable induction coils 406 may extend less than the full length of composite wing 304. In some illustrative examples, plurality of conformable induction coils 406 may only extend such that a magnetic field is generated in a desired area.

As depicted, elastomeric material 404 is one elastomeric sheet between second tool 314 and composite wing 304. In some illustrative examples, elastomeric material 404 may be more than one elastomeric sheet present between second tool 314 and composite wing 304. Further, as depicted, elastomeric material 404 and plurality of conformable induction coils 408 extend across the full length of the cross-section of composite wing 304. However, in some illustrative examples, plurality of conformable induction coils 408 may extend less than the full length of composite wing 304. In some illustrative examples, plurality of conformable induction coils 408 may only extend such that a magnetic field is generated in a desired area.

As depicted, elastomeric material 402 and elastomeric material 404 are sealed together by sealant 410 and sealant 412. Elastomeric material 402, elastomeric material 404, sealant 410, and sealant 412 form a sealed cavity in which inert gas or a vacuum may be drawn.

Number of bladders 414 is positioned within composite wing 304. Number of bladders 414 provides support to skin panels 306 and support structure 308 during joining of skin panels 306 and support structure 308. Specifically, number of bladders 414 may be inflated to provide pressure during joining of skin panels 306 and support structure 308. As depicted, bladder 416 is positioned beside composite wing 304 in joining system 302. Bladder 416 may provide pressure against composite wing 304 during joining.

Number of conductive plates 418 is positioned such that a generated magnetic field is present in a desired area. The desired area may include a joint location containing a magnetically permeable material. As depicted, number of conductive plates 418 is positioned between number of bladders 414 and skin panels 306. As depicted, number of conductive plates 418 is positioned between each of number of bladders 414 and skin panels 306. However, in some illustrative examples, number of conductive plates 418 may not be positioned between each of number of bladders 414. As one illustrative example, number of conductive plates 418 may instead only be positioned between skin panels 306 and bladder 420, bladder 422, and bladder 424. A more detailed view of section 426 is shown in FIG. 5 below.

Figure 5:
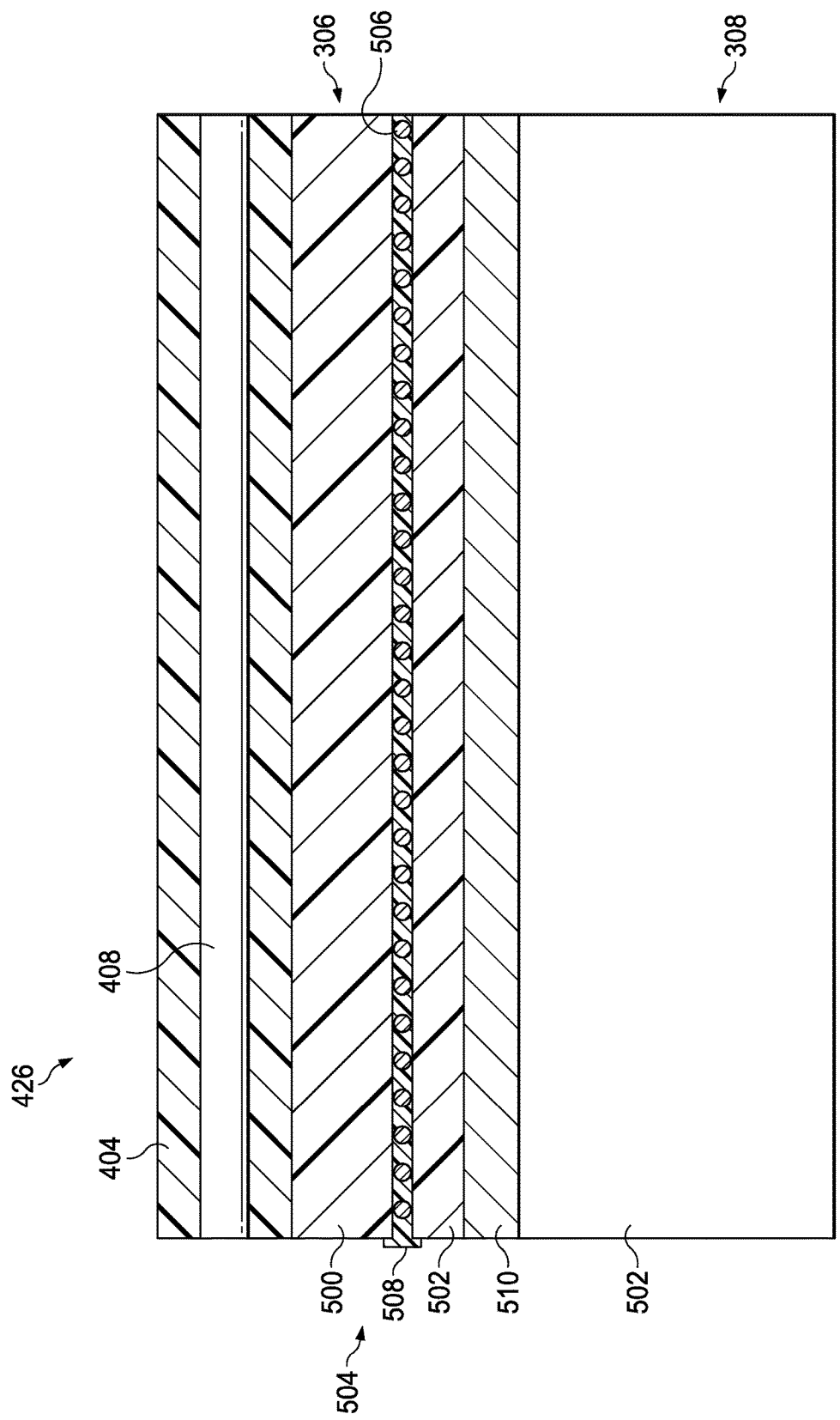
FIG. 5 is a more detailed illustration of a portion of a composite wing in a joining system in accordance with an illustrative embodiment.

Turning now to FIG. 5, a more detailed illustration of a portion of a composite wing in a joining system is depicted in accordance with an illustrative embodiment. A more detailed view of section 426 from Direction 5 of FIG. 4 is shown in this figure.

As depicted, portion 500 of skin panels 306 is positioned relative to composite part 502 of support structure 308 to form joint location 504. Joint location 504 may include at least one of parts of portion 500, parts of composite part 502, and the space in between portion 500 and composite part 502.

As depicted, magnetically permeable material 506 is positioned within thermoplastic material 508 in joint location 504. In this illustrative example, magnetically permeable material 506 comprises wires embedded in thermoplastic material 508. Further, the wires are directed orthogonal to plurality of conformable induction coils 408 embedded in elastomeric material 404. In this illustrative example, thermoplastic material 508 is placed between portion 500 and composite part 502 in joint location 504. In some other illustrative examples, portion 500 comprises a thermoplastic material. In these illustrative examples, magnetically permeable material 506 may be positioned within the thermoplastic material of portion 500 in joint location 504. In yet other illustrative examples, composite part 502 comprises a thermoplastic material. In these illustrative examples, magnetically permeable material 506 may be positioned within the thermoplastic material of composite part 502 in joint location 504.

Conductive plate 510 of number of conductive plates 418 in FIG. 4 is positioned relative to joint location 504 such that the magnetic field generated by plurality of conformable induction coils 408 is present in a desired area. In some illustrative examples, the desired area contains magnetically permeable material 506 in joint location 504. In some illustrative examples, the desired area does not include composite part 502 or includes only a small portion of composite part 502.

Figure 6:
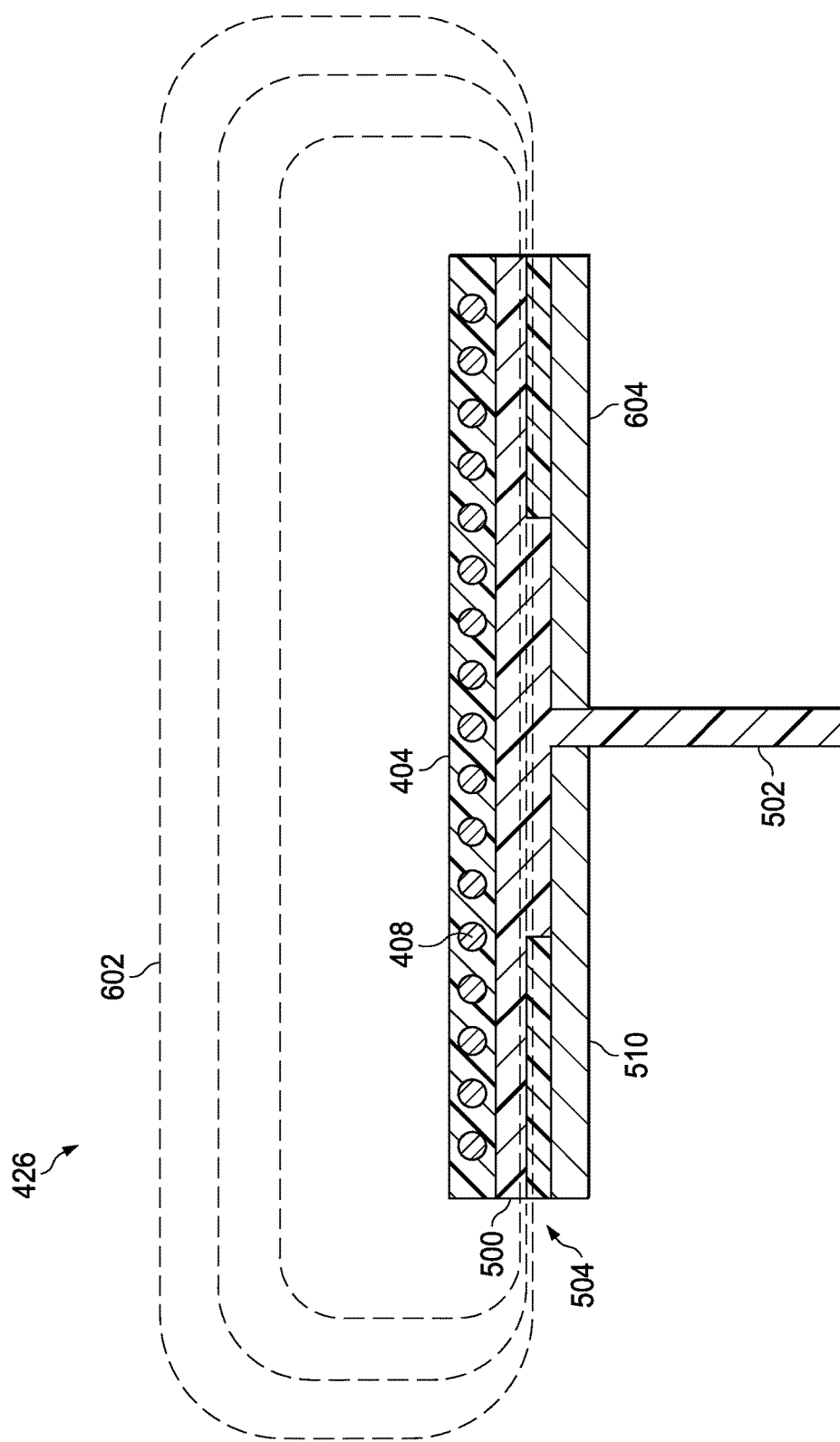
FIG. 6 is a more detailed illustration of a portion of a composite wing in a joining system in accordance with an illustrative embodiment.

With reference next to FIG. 6, a more detailed illustration of a portion of a composite wing in a joining system is depicted in accordance with an illustrative embodiment. A more detailed view of section 426 from the same direction as FIG. 4 is shown in this figure.

As depicted, magnetic field 602 is generated by plurality of conformable induction coils 408 embedded in elastomeric material 404. Conductive plate 510 and conductive plate 604 are positioned relative to joint location 504 such that magnetic field 602 is present in a desired area. As depicted, magnetic field 602 is present in joint location 504. As depicted, magnetic field 602 is not present in portion 500 or composite part 502 outside of joint location 504. In some illustrative examples, magnetic field 602 may be present in parts of portion 500 or parts of composite part 502 outside of joint location 504. In some illustrative examples, the positions of conductive plate 510 and conductive plate 604 may prevent or substantially restrict magnetic field from all of or portions of composite part 502.

Figure 7:
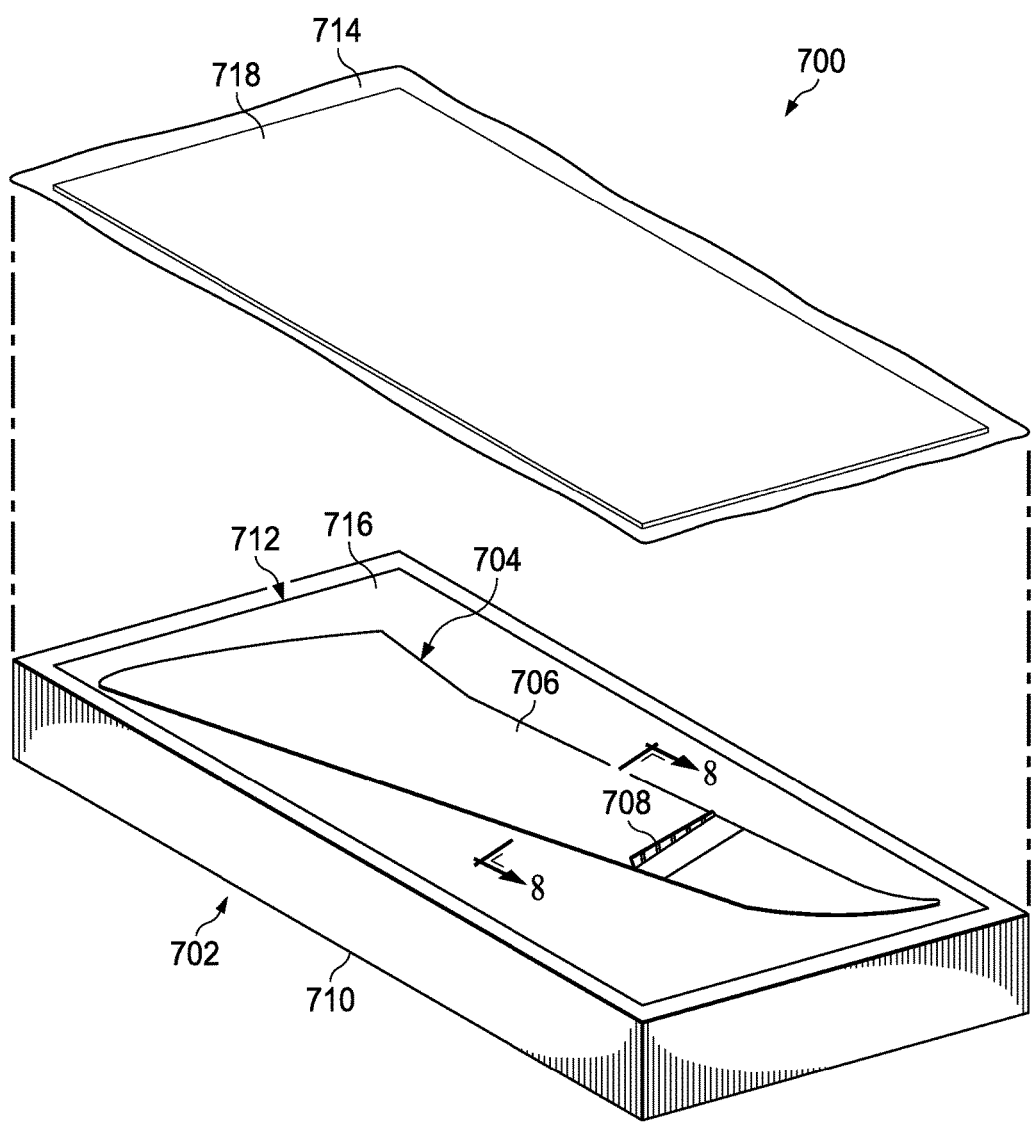
FIG. 7 is an illustration of a composite wing and a joining system in accordance with an illustrative embodiment.

Turning now to FIG. 7, an illustration of a composite wing and a joining system is depicted in accordance with an illustrative embodiment. Environment 700 is a physical implementation of manufacturing environment 200 of FIG. 2.

Environment 700 includes joining system 702 and composite wing 704. Joining system 702 is a physical implementation of joining system 210 of FIG. 2. Joining system 702 is used to join skin panels 706 and support structure 708. Support structure 708 may include ribs and spars as well as other parts. As depicted, these different parts in composite wing 704 are composite parts.

Joining system 702 includes tool 710, induction heating system 712, and vacuum bag 714. Tool 710 may be formed of a material having desirable properties. Desirable properties for tool 710 may include at least one of cost of material, cost of manufacture, time of manufacture, heat properties of the material, non-reactivity, rigidity, and other material properties. In some illustrative examples, tool 710 may be manufactured from machineable materials. In one illustrative example, tool 710 is manufactured from a polyurethane foam style board such as Ren board.

Induction heating system 712 includes elastomeric material 716 and elastomeric material 718. As depicted, elastomeric material 716 is associated with tool 710 and elastomeric material 718 is associated with vacuum bag 714.

As depicted, composite wing 704 is a physical implementation of composite structure 206 of FIG. 2. Composite wing 704 may be formed of at least one of thermoplastic materials or thermoset materials. As depicted, composite wing 704 is shown in a partially completed state. As depicted, composite wing 704 includes skin panels 706 and support structure 708. Support structure 708 may include ribs and spars as well as other parts. As depicted, these different parts in composite wing 704 are composite parts.

Figure 8:
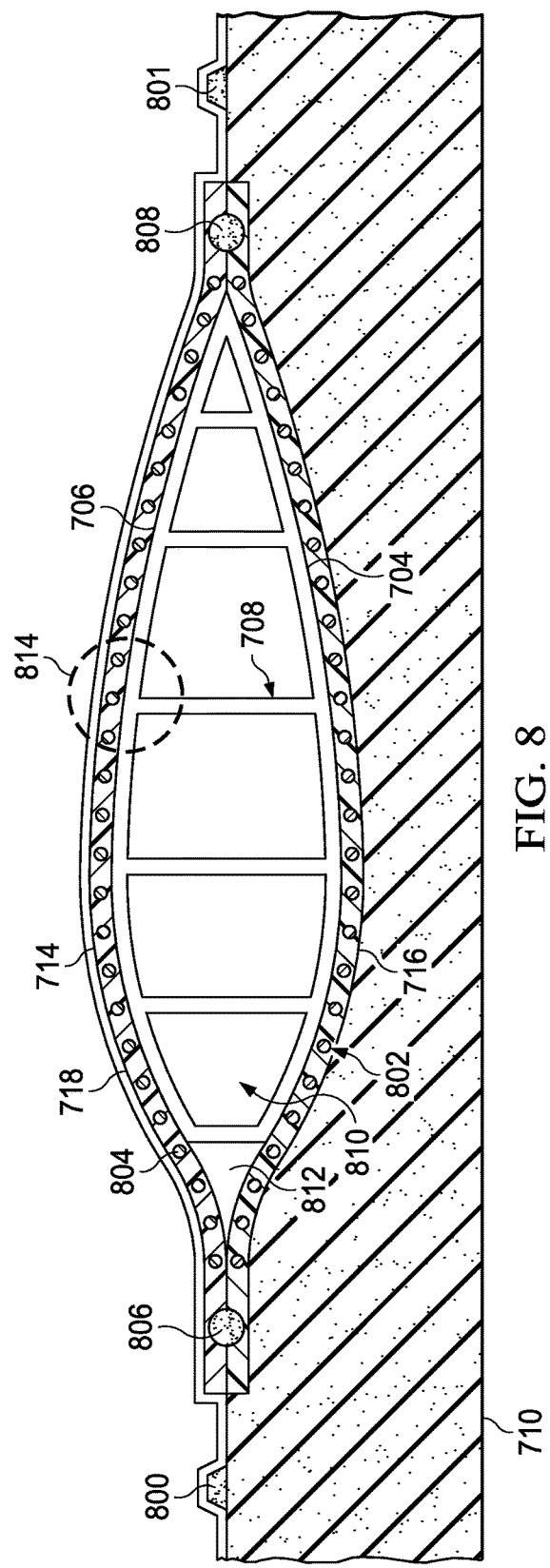
FIG. 8 is an illustration of a cross-section of a composite wing in a joining system in accordance with an illustrative embodiment.

With reference next to FIG. 8, an illustration of a cross-section of a composite wing in a joining system is depicted in accordance with an illustrative embodiment. In this illustrative example, a cross-sectional view of environment 700 is shown taken along lines 8-8 in FIG. 7.

As depicted, composite wing 704 is placed onto tool 710. More specifically, composite wing 704 rests on elastomeric material 716. As depicted, composite wing 704 is positioned between elastomeric material 716 and elastomeric material 718 of induction heating system 712. Vacuum bag 714 is positioned over elastomeric material 718 and sealed to tool 710 using seal 800 and seal 801. Plurality of conformable induction coils 802 are embedded in elastomeric material 716. Plurality of conformable induction coils 804 are embedded in elastomeric material 718. As depicted, elastomeric material 716 is one elastomeric sheet between tool 710 and composite wing 704. In some illustrative examples, elastomeric material 716 may be more than one elastomeric sheet present between tool 710 and composite wing 704. Further, as depicted, elastomeric material 716 and plurality of conformable induction coils 802 extend across the full length of the cross-section of composite wing 704. However, in some illustrative examples, plurality of conformable induction coils 802 may extend less than the full length of composite wing 704. In some illustrative examples, plurality of conformable induction coils 802 may only extend such that a magnetic field is generated in a desired area.

As depicted, elastomeric material 718 is one elastomeric sheet between vacuum bag 714 and composite wing 704. In some illustrative examples, elastomeric material 718 may be more than one elastomeric sheet present between vacuum bag 714 and composite wing 704. Further, as depicted, elastomeric material 718 and plurality of conformable induction coils 804 extend across the full length of the cross-section of composite wing 704. However, in some illustrative examples, plurality of conformable induction coils 804 may extend less than the full length of composite wing 704. In some illustrative examples, plurality of conformable induction coils 804 may only extend such that a magnetic field is generated in a desired area.

As depicted, elastomeric material 716 and elastomeric material 718 are sealed together by sealant 806 and sealant 808. In some illustrative examples, elastomeric material 716, elastomeric material 718, sealant 806 and sealant 808 may form a sealed cavity in which inert gas or a vacuum may be drawn. In some illustrative examples, a vacuum may be drawn between vacuum bag 714 and tool 710.

Number of bladders 810 is positioned within composite wing 704. Number of bladders 810 provides support to skin panels 706 and support structure 708 during joining of skin panels 706 and support structure 708. Specifically, number of bladders 810 may be inflated to provide pressure during joining of skin panels 706 and support structure 708. As depicted, bladder 812 is positioned beside composite wing 704 in joining system 702. Bladder 812 may provide pressure against composite wing 704 during joining. A more detailed view of section 814 is shown in FIG. 9 below.

Figure 9:
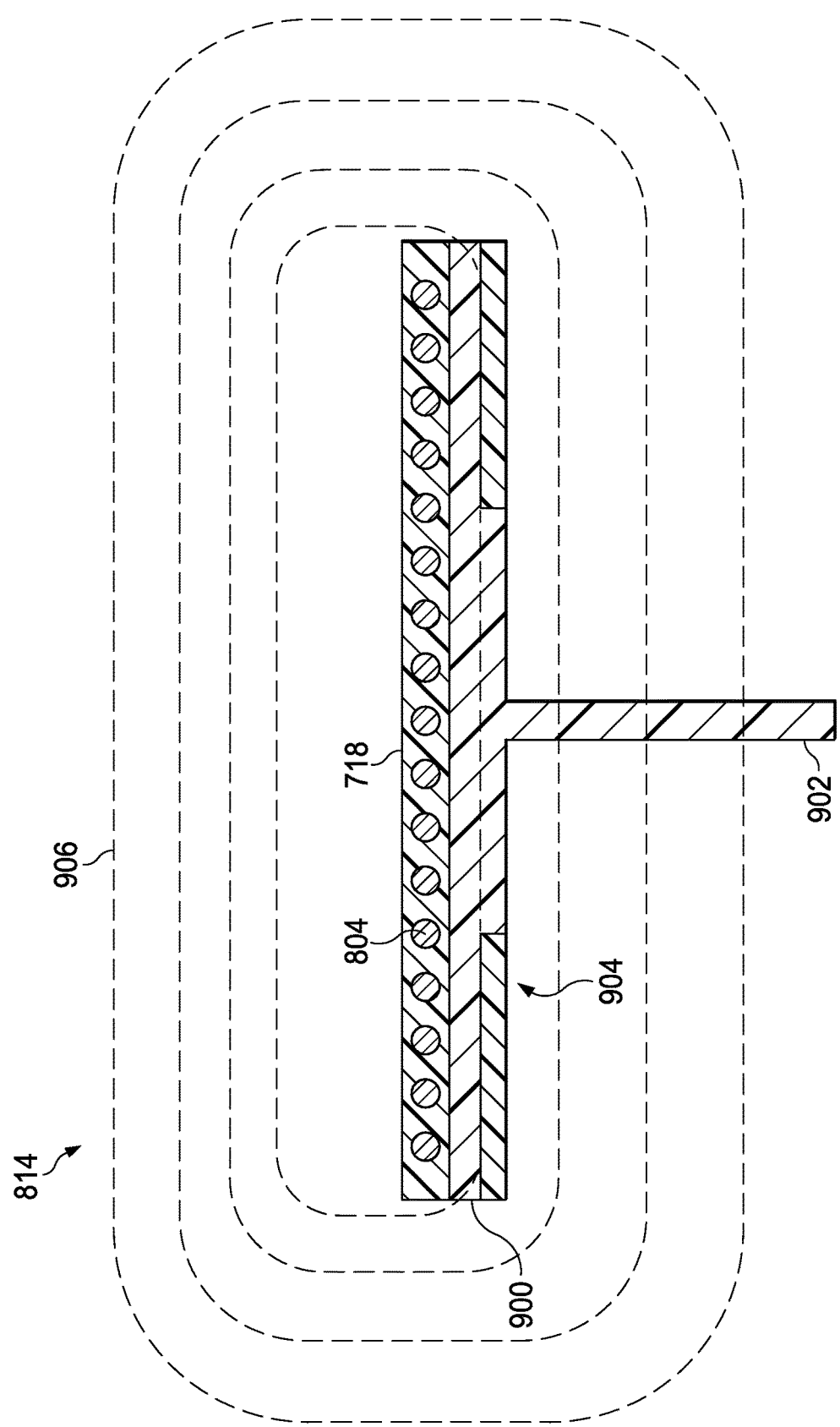
FIG. 9 is a more detailed illustration of a portion of a composite wing in a joining system in accordance with an illustrative embodiment.

Turning now to FIG. 9, a more detailed illustration of a portion of a composite wing in a joining system is depicted in accordance with an illustrative embodiment. A more detailed view of section 814 from the same direction as FIG. 8 is shown in this figure.

As depicted, portion 900 of skin panels 706 is positioned relative to composite part 902 of support structure 708 to form joint location 904. Joint location 904 may include at least one of parts of portion 900, parts of composite part 902, and the space in between portion 900 and composite part 902. A magnetically permeable material is positioned within a thermoplastic material in joint location 904. In one illustrative example, the thermoplastic material is placed between portion 900 and composite part 902 in joint location 904. In some other illustrative examples, portion 900 comprises a thermoplastic material. In these illustrative examples, the magnetically permeable material may be positioned within the thermoplastic material of portion 900 in joint location 904. In yet other illustrative examples, composite part 902 comprises a thermoplastic material. In these illustrative examples, the magnetically permeable material may be positioned within thermoplastic material of composite part 902 in joint location 904.

As depicted, magnetic field 906 is generated by plurality of conformable induction coils 804 embedded in elastomeric material 718. Magnetic field 906 extends unobstructed from plurality of conformable induction coils 804. As depicted, magnetic field 906 is present in a desired area. Further, as depicted, magnetic field 906 extends into both portion 900 and composite part 902.

Figure 10:
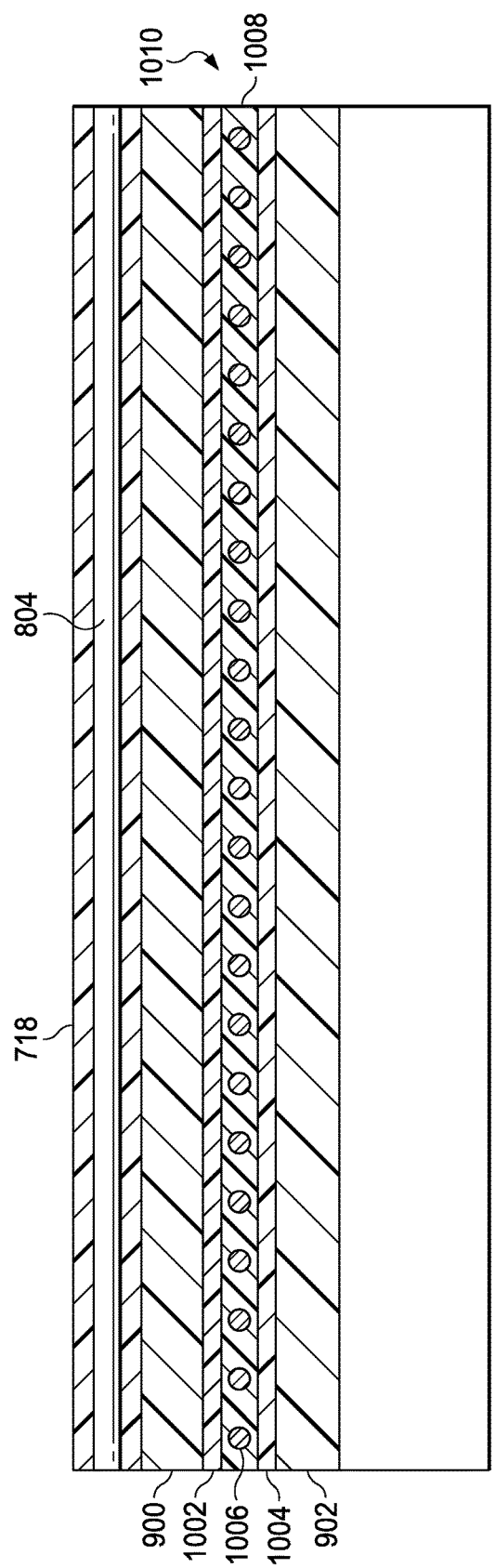
FIG. 10 is a more detailed illustration of a portion of a composite wing in a joining system in accordance with an illustrative embodiment.

FIG. 10 is a more detailed illustration of a portion of a composite wing in a joining system in accordance with an illustrative embodiment. A more detailed view of section 814 from Direction 10 of FIG. 8 is shown in this figure.

As depicted, portion 900 of skin panels 706 is positioned relative to composite part 902 of support structure 708 to form joint location 904. Joint location 904 may include at least one of parts of portion 900, parts of composite part 902, and the space in between portion 900 and composite part 902.

In this illustrative example, portion 900 of skin panels 706 and composite part 902 are formed of at least one thermoset material. As depicted, first thermoplastic layer 1002 is associated with portion 900 of skin panels 706. First thermoplastic layer 1002 provides a joining surface for portion 900 of skin panels 706. First thermoplastic layer 1002 has a desired thickness. In some illustrative examples, first thermoplastic layer 1002 has a thickness of about 0.003 inches to about 0.012 inches. In some illustrative examples, first thermoplastic layer 1002 may be joined to portion 900 of skin panels 706 using a co-curing process. In a co-curing process, first thermoplastic layer 1002 and portion 900 of skin panels 706 may be heated together.

As depicted, second thermoplastic layer 1004 is associated with composite part 902. Second thermoplastic layer 1004 provides a joining surface for composite part 902. Second thermoplastic layer 1004 has a desired thickness. In some illustrative examples, second thermoplastic layer 1004 has a thickness of about 0.003 inches to about 0.012 inches. In some illustrative examples, second thermoplastic layer 1004 may be joined to composite part 902 using a co-curing process. In a co-curing process, second thermoplastic layer 1004 and composite part 902 may be heated together.

In this illustrative example, magnetically permeable material 1006 may be embedded in thermoplastic material 1008 between first thermoplastic layer 1002 and second thermoplastic layer 1004. As depicted, magnetically permeable material 1006 is positioned within thermoplastic material 1008 in joint location 1010. In this illustrative example, magnetically permeable material 1006 comprises wires embedded in thermoplastic material 1008. Further, the wires are directed orthogonal to plurality of conformable induction coils 804.

To join portion 900 of skin panels 706 and composite part 902, a magnetic field is generated with plurality of conformable induction coils 804. The magnetic field is configured to generate heat in magnetically permeable material 1006 in joint location 1010. The heat softens first thermoplastic layer 1002, thermoplastic material 1008, and second thermoplastic layer 1004 and joins portion 900 of skin panels 706 and composite part 902 to each other.

The time the heat is generated may be controlled based on material characteristics of the thermoset material of at least one of portion 900 of skin panels 706 and composite part 902. In some illustrative examples, the time the heat is generated may be controlled such that temperature guidelines of a thermoset material of at least one of portion 900 of skin panels 706 and composite part 902 is maintained. Temperature guidelines may be present for a thermoset material such that a thermoset material maintains desirable structural properties. In one illustrative example, a temperature guideline of a thermoset material may be a maximum temperature of 430 degrees Fahrenheit for one minute. In this illustrative example, the time the heat is generated may be controlled such that a thermoset material only reaches the maximum temperature of 430 degrees Fahrenheit for a maximum of one minute.

The illustrations of the joining of composite parts in FIGS. 3-10 are not meant to imply limitations to the manner in which other illustrative embodiments may be implemented. For example, although a joint location has been shown as being formed between a skin panel and a rib, a joint location may be formed in accordance with an illustrative embodiment between other parts. For example, a joint location may be formed between a skin panel and a spar. A joint location also may be formed between other components such as a wing to a body joint location, a horizontal stabilizer to a body joint, a vertical stabilizer to a body joint, a floor beam to a fuselage joint, and other suitable components.

Also, the different components shown in FIGS. 3-10 may be combined with components in FIG. 2, used with components in FIG. 2, or a combination of the two. Additionally, some of the components in FIGS. 3-10 may be illustrative examples of how components shown in block form in FIG. 2 can be implemented as physical structures.

Figure 11:
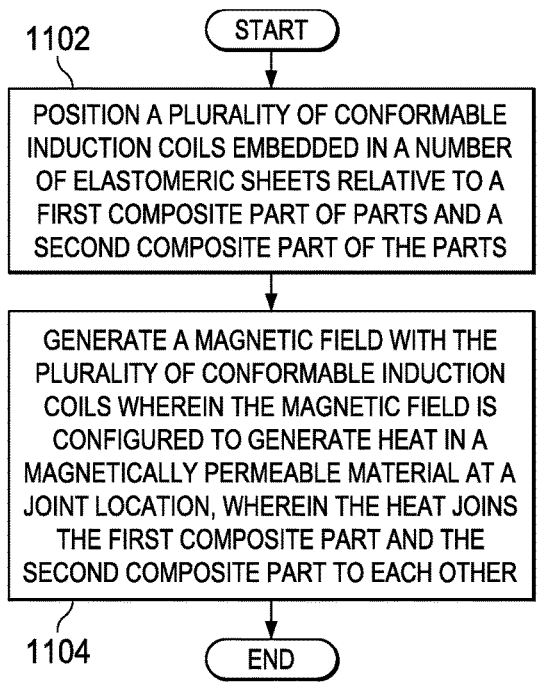
FIG. 11 is an illustration of a flowchart of a process for joining parts in accordance with an illustrative embodiment.

With reference next to FIG. 11, an illustration of a flowchart of a process for joining parts is depicted in accordance with an illustrative embodiment. The process illustrated in FIG. 11 may be implemented in manufacturing environment 200 to form structure 202 in FIG. 2. For example, the operations of this process may be implemented in joining system 211 to form structure 202.

The process begins by positioning a plurality of conformable induction coils embedded in a number of elastomeric sheets relative to a first composite part of parts and a second composite part of the parts (operation 1102). In operation 1102, the number of elastomeric sheets may cover a portion of at least one of the first composite part and the second composite part. In some illustrative examples, the number of elastomeric sheets may cover all of at least one of the first composite part and the second composite part.

The process then generates a magnetic field with the plurality of conformable induction coils, wherein the magnetic field is configured to generate heat in a magnetically permeable material at a joint location, wherein the heat joins the first composite part and the second composite part to each other (operation 1104), with the process terminating thereafter. In operation 1104, the magnetically permeable material is embedded in a thermoplastic material in the joint location. The thermoplastic material may be a thermoplastic material placed between the first composite part and the second composite part. In some other illustrative examples, the thermoplastic material may be within one of the first composite part and the second composite part. After joining the first composite part and the second composite part, the plurality of conformable induction coils may be used to join other parts to form a structure having a different cross-sectional shape.

Figure 12:
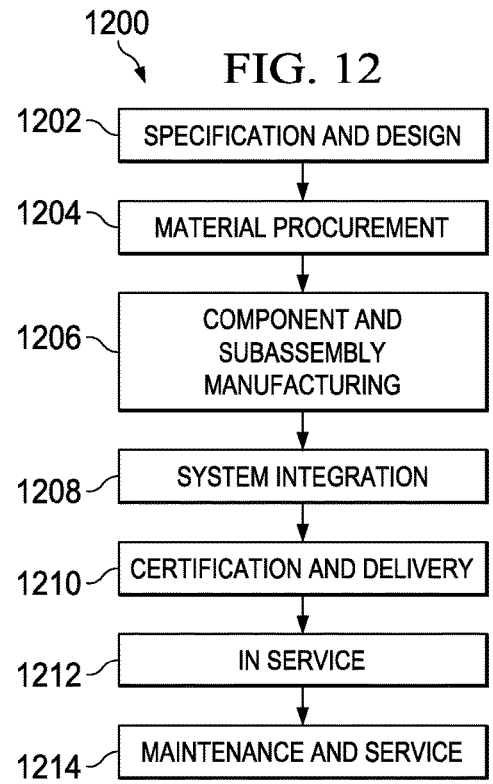
FIG. 12 is an illustration of an aircraft manufacturing and service method in the form of a block diagram in accordance with an illustrative embodiment.
Figure 13:
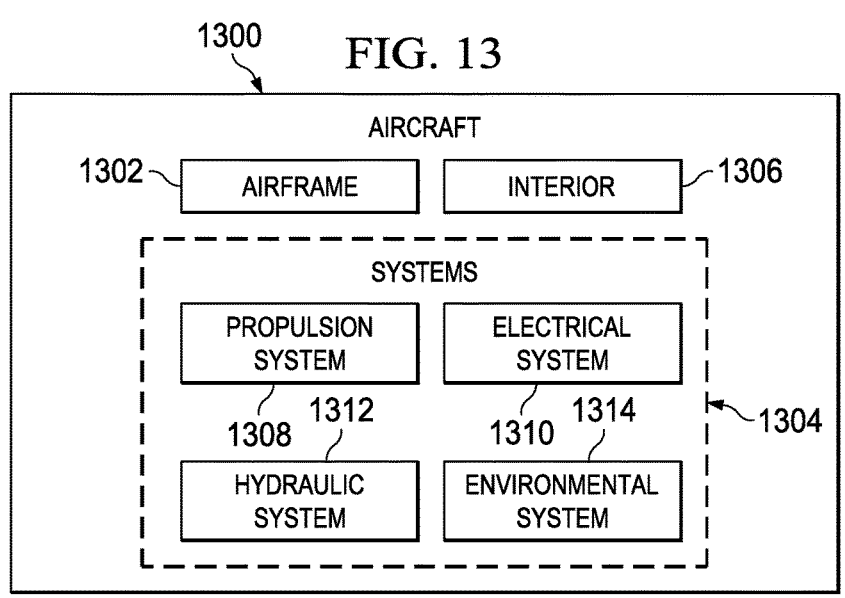
FIG. 13 is an illustration of an aircraft in the form of a block diagram in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in the form of a block diagram in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1213. While in service 1213 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in the form of a block diagram in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12. One or more illustrative embodiments may be used during component and subassembly manufacturing 1206. For example, structure 202 in FIG. 2 may be joined during component and subassembly manufacturing 1206. Further, structure 202 may also be used to perform replacements during maintenance and service 1214. For example, aircraft 1300 may be inspected during scheduled maintenance for aircraft 1300.

Thus, the illustrative embodiments provide a method and apparatus for joining parts. A plurality of conformable induction coils embedded in a number of elastomeric sheets is positioned relative to a first composite part of the parts and a second composite part of the parts. A magnetic field is generated with the induction coils. The magnetic field is configured to generate heat in a magnetically permeable material at a joint location. The heat joins the first composite part and the second composite part to each other.

By using plurality of conformable induction coils 226 instead of conventional rigid induction tooling with induction coils embedded in the tools, magnetic field generator 222 may be used to form structures of varying cross-sections. Further, by using plurality of conformable induction coils 226, magnetic field generator 222 may be less expensive than conventional induction tooling. Yet further, by using plurality of conformable induction coils 226, magnetic field generator 222 may use fewer resources to store and transport magnetic field generator 222.

Further, by using number of tools 214 formed of machineable materials 250, joining system 210 may be less expensive. Yet further, by using number of tools 214 formed of machineable materials 250, creating joining system 210 for structure 202 may take less time than creating conventional induction tooling.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for joining a first composite part and a second composite part, the apparatus comprising:
    a number of elastomeric sheets;
    a plurality of conformable induction coils embedded in the number of elastomeric sheets;
    a number of tools;
    a magnetically permeable material configured to generate heat when exposed to a magnetic field; and
    a number of conductive plates positioned relative to a joint location between the first composite part and the second composite part such that the magnetic field is present in a desired area.

2. The apparatus of claim 1, wherein the plurality of conformable induction coils comprise a plurality of lengths of Litz wire.

3. The apparatus of claim 1, wherein the magnetically permeable material is embedded in a thermoplastic material in at least one of the first composite part, the second composite part, or a thermoplastic material placed between the first composite part and the second composite part.

4. The apparatus of claim 1, wherein the plurality of conformable induction coils extend less than a full length of one of the first composite part and the second composite part.

5. The apparatus of claim 1, further comprising:
    a vacuum bag sealed to a tool in the number of tools.

6. The apparatus of claim 1, further comprising:
    a number of bladders; and
    a power source configured to be operatively coupled to the plurality of conformable induction coils.

7. The apparatus of claim 1, wherein the number of tools is formed of a machineable material.

8. The apparatus of claim 1, wherein the number of tools is formed of a polyurethane foam board.

9. The apparatus of claim 1, wherein the magnetically permeable material comprises wires embedded in a thermoplastic material, and wherein the wires are directed orthogonal to the plurality of conformable induction coils.

* * * * *